May 7, 1968 B. G. COPPING 3,381,443
PACKAGE FORMING AND HEAT SHRINK BANDING APPARATUS
Filed June 21, 1965 5 Sheets-Sheet 2

INVENTOR.
BRUCE G. COPPING
BY Oldham & Oldham
ATTYS.

May 7, 1968  B. G. COPPING  3,381,443
PACKAGE FORMING AND HEAT SHRINK BANDING APPARATUS
Filed June 21, 1965  5 Sheets-Sheet 4

INVENTOR.
BRUCE G. COPPING
BY Oldham & Oldham
ATTYS.

United States Patent Office 3,381,443
Patented May 7, 1968

3,381,443
PACKAGE FORMING AND HEAT SHRINK
BANDING APPARATUS
Bruce G. Copping, Akron, Ohio, assignor to Geo. J.
Meyer Manufacturing Co., Cudahy, Wis., a corporation of Wisconsin
Filed June 21, 1965, Ser. No. 465,613
20 Claims. (Cl. 53—30)

ABSTRACT OF THE DISCLOSURE

Article packages are formed wherein a plurality of articles are received within a plastic film that is heat shrunk into engagement with the packages being processed. A heat shrink tunnel is provided to receive a stream of articles being moved along a fixed path in longitudinally spaced groups and means are provided to sever a continuous plastic band positioned around the articles into individual sections engaging the individual groups of articles. The heat shrink tunnel includes air circulating means and flow path controls. The tunnel is characterized by being movable vertically out of operative association with the articles being packaged and means are present to enclose the heat shrink tunnel when elevated to maintain the temperature thereof at a predetermined value should operation of the machine be interrupted whereby the heat shrink tunnel is ready for instantaneous reuse in a continuous article packaging action.

---

The present invention relates to package forming apparatus, and particularly to package forming wherein a plurality of articles are packaged into an attractive, compact voltage by use of heat shrinkable plastic film.

Heretofore there have been various types of apparatus and methods proposed for forming packages from a plurality of articles, and one of such methods is shown in my own prior co-pending patent application Ser. No. 228,612, filed Oct. 5, 1962 now Pat net No. 3,239,991, issued Mar. 15, 1966.

In general, these prior art machines are adapted to take a continuous sheet of a plastic film, usually transparent and heat shrinkable, and conventional means are used to form such film into an endless tube that is formed around a stream of articles being fed through a fixed path in the apparatus. These articles may be in one or two rows or more, as desired, and the package form may contain three, six, eight or other quantities of units, as desired. In some instances, a top carrier member is associated with the articles as flowing along in a stream and have such top carrier enclosed within the band of plastic material formed around the articles. Then, in the prior art practice, the plastic film has been cut into sections before or after it has been heat shrunk into engagement with the articles therein to provide the finished package.

While the prior types of machines and methods used for package forming action have been fairly satisfactory, it always is desirable to have these machines operate more rapidly, and to form the package in a tight, compact, final form automatically, but yet such apparatus must be capable of being interrupted when something has gone wrong with the machine or the packages being formed. It is difficult to adapt the machine to be started up again and have immediately satisfactory package forming actions. Prior machines have been difficult to restart when they have had the flow therethrough interrupted, and they have been subject to other disadvantages.

The general object of the present invention is to provide a new package forming and heat shrink banding apparatus which is characterized by novel means associated with two heat shrink tunnels provided to facilitate interruption of flow of packages through the machine and restart of the machine under completely satisfactory operating conditions available immediately when the apparatus is restarted.

Another object of the invention is to provide effective means for sealing overlapped edges of a heat sealable plastic film together after the plastic film has been formed from a flat sheet to a generally tubular structure in which articles can be or are enclosed.

A further object of the invention is to provide heat shrink tunnels that are adapted for vertical movement to and from operative association with a conveyor or other means on which a stream of articles being packaged are enclosed, and to provide air circulating means in association with the shrink tunnel whereby heated air can be circulated effectively around and to all portions of a heat shrinkable film being used for enclosing a plurality of articles into a package.

Another object of the invention is to provide novel conveyor means to aid in engaging articles being gathered together into packages for package forming action and to move such articles positively through a fixed path for forming an attractive, compact, package assembly therefrom.

Further objects of the invention are to provide novel and improved package forming apparatus wherein an elongate tube or band of plastic film is moved relative to a stream of articles being fed through the apparatus to separate the articles into groups of articles for packaging action; to engage end articles of a group with end portions of an enclosure band; to provide tunnel means having spaced inner and outer walls and air circulating means in association with the tunnel means for circulating air therethrough; to provide support means for a tunnel with registrable openings being provided in the support means and the lower end of the tunnel to facilitate air flow to the bottom area of packages being processed for heat shrink action on the film enclosing bottom areas of the packaged articles; to provide novel and improved means in package forming apparatus by heat shrink action wherein a heat shrink tunnel can be completely enclosed when it is moved to an inoperative position; to provide means in apparatus of the class described wherein burning or excessive heating of the plastic banding film is prevented when flow of the articles and plastic film through the apparatus is interrupted; to provide novel means in the apparatus for enclosing the lower end of a heat shrink tunnel having an open bottom portion when the tunnel is moved to an inoperative position; to provide means for closing the ends of a heat shrink tunnel when it is moved to an inoperative position; to provide a heat shrink tunnel that is automatically maintained at its operative temperature, even when moved to an inoperative position, and which primarily recirculates heated air therethrough; and to grip the ends of a plastic film band before heat shrinking the band into final engagement with a group of articles.

The foregoing and other objects and advantages of the invention will be made more apparent as the specification proceeds.

Attention now is particularly directed to the accompanying drawings, wherein.

The present invention, generally speaking, relates to a method of packaging articles wherein a stream of abutted upright articles are fed into the apparatus and a continuous strip of plastic film is formed into a tube to enclose the articles, which tube and articles are then continually moved through a fixed path and wherein the invention comprises the improvement of heating the plastic tube of film at a local section thereof to shrink it into engagement with its associated articles as these articles and film move along their fixed path, cutting the tube of film on its top and bottom portions intermediate groups of articles formed in the film, pressing the film against the top and bottom of its associated articles, cutting the opposed sides of the film intermediate the groups of articles to sever the film into sections, and finally heating the film sections to shrink the film into tight engagement with the groups of articles. The invention further comprises and relates to the provision of a novel heat shrink tunnel through which an elongate plastic tube and articles are moved, means positioning the tunnel for vertical movement to and from operative association with the tube and articles, heated air circulating means operatively connected to the tunnel, means present in association with the tunnel for closing the ends thereof when it is elevated, closure flaps for the bottom of the tunnel and pivotally associated with the tunnel adjacent the sides thereof to cover the bottom thereof, and means are present to control the closure flaps and move them to operative positions covering the bottom of the tunnel when elevated.

Attention now is particularly directed to the details of the structure shown in the accompanying drawings, and a package forming apparatus of the invention is indicated as a whole by the numeral 1. The apparatus 1 includes a suitable frame 2 and it carries a plurality of abutted articles, such as containers or cans 4, that are pushed along into the apparatus on a fixed path by conventional means (not shown). These articles 4 are shown as comprising a plurality of cans that may contain soft drinks, or beer, for example, or other types of articles can be packaged, as desired. In all events, the apparatus 1 is not shown completely in the drawings, and the upstream end of this apparatus is of substantially conventional design. Such apparatus includes means for automatically and continuously feeding a plurality of the abutted articles 4 into the apparatus shown for movement therealong, as hereinafter described. In this instance, the articles are formed in two longitudinal rows with the articles in the rows being transversely aligned. A paperboard or cardboard top member, or top holder 5, FIG. 2, is associated with the articles in the streams of articles being fed to and moved along by the apparatus so that such top member will be enclosed with a group of the articles 4 within a tube 6 formed from a continuous elongate sheet of a heat shrinkable plastic film 7, normally transparent, and wherein such transparent film 7 is formed to a suitable width that it can be led into a substantially conventional film forming member or collar 8 which accepts the film 7 in the form of a continuous substantially flat in cross section sheet that is folded by the member or collar 8 into the tube 6 that loosely encloses the articles 4.

Figure 2:
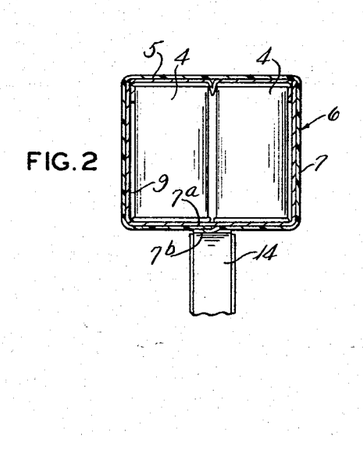
FIG. 2 is a fragmentary side elevation of a portion of the apparatus embodying the principles of the invention for use in package forming and heat shrink banding actions.

FIG. 2 of the drawings shows that, as the articles 4 have the tube 6 of plastic film formed therearound, they may be partly enclosed and be guided by a U-shaped guide 9 that supports the articles 4. The bottom of the guide 9 usually has overlapped sections 7a and 7b of the film 7 provided thereon and extending longitudinally of the articles whereby a continuous heat seal means 11 can be brought up into engagement with the overlapped film areas 7a and 7b to effect a continuous heat sealing action therebetween as the articles and film are moved through a fixed path in the apparatus. The heat seal means 11 is shown as comprising a support plate or frame 12 that has a suitably heated mandrel, or support 13 at the upper margin thereof. The plate 12 further positions a suitable heat resistant tape or band 14 thereon for controlled movement over the mandrel 13 along with the film 7 as it is moved in the apparatus whereby this tape permits flow of heat from the mandrel 13 to the film but does not permit the film to stick to the mandrel and cause any objectionable heating of the plastic film. Thus, only sufficient heat is transmitted to the overlapped film edges as to provide the desired heat seal action therebetween. The plate 12 and associated means are shown in inoperative position, and the position of this plate 12 and means carried thereby is controlled by a member, such as a cylinder 15 that has a piston rod 16 extending therefrom. Actuation of the cylinder 15 moves the piston rod 16 to swing the top edge of the plate 12 up to a position parallel to the lower surface of the articles being processed by the apparatus to force the band 11 against the overlapped film to provide the desired heat seal action on the film as it is moved through the apparatus. The plate 12 can be pivoted downwardly from either end thereof to inoperative position with the mandrel 13 spaced from the film.

*First heat shrink tunnel*

Figure 5:
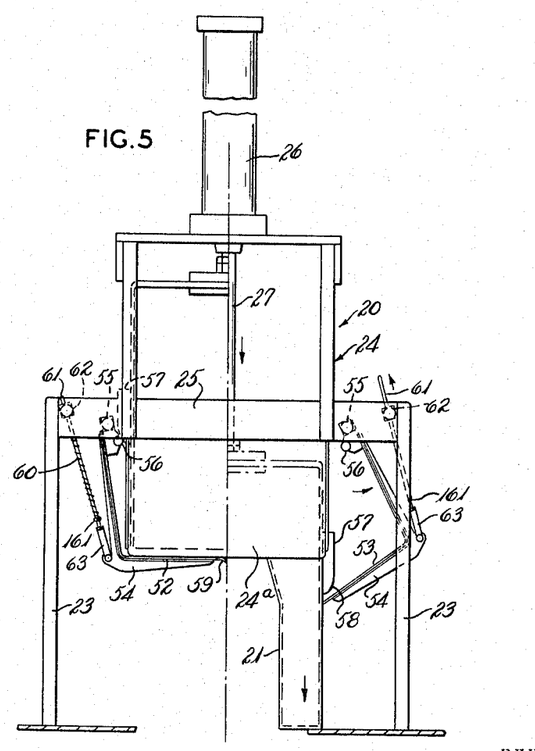
FIG. 5 is an enlarged end elevation of the first heat shrink tunnel shown in FIG. 1 and with a portion of the heat shrink tunnel being shown in its lowered operative position and with another section of the tunnel being shown in its raised, inoperative form.
Figure 6:
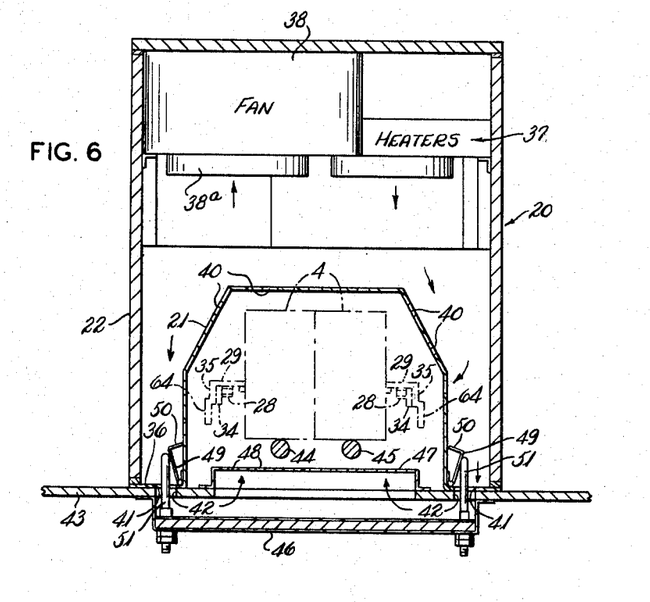
FIG. 6 is a fragmentary vertical section taken through the first heat shrink tunnel of FIG. 1 and associated support means.

FIG. 6 of the apparatus best shows a vertical section of the first heat shrink tunnel 20 provided in the apparatus 1 of the invention. Such heat shrink tunnel 20 includes an inner wall 21 and an outer wall 22 that are suitably secured together at the ends and lower portions thereof and with the heat shrink tunnel 20 being mounted for vertical movement to and from operative association with the conveyor on which the articles 4 are positioned. The heat shrink tunnel 20 also includes a suitable fixed support, FIG. 5, including arms 23 that extend upwardly from the main frame 2 and secure an upper frame, frame or box 24 in association with the tunnel 20 by means of members, such as cross bars 25 engaging and extending across the apparatus between a pair of the arms 23, and to which the cover, 4-sided box 24, is secured. The upper frame 24 also supports a member thereon, such as a cylinder 26, that has a suitable piston rod 27 extending therefrom so that the piston rod 27 engages and mounts the heat shrink tunnel 20 and can move it vertically downwardly out of the cover or box 24 or raise it up into the box 24, as desired, by control of the cylinder 26.

Figure 1:
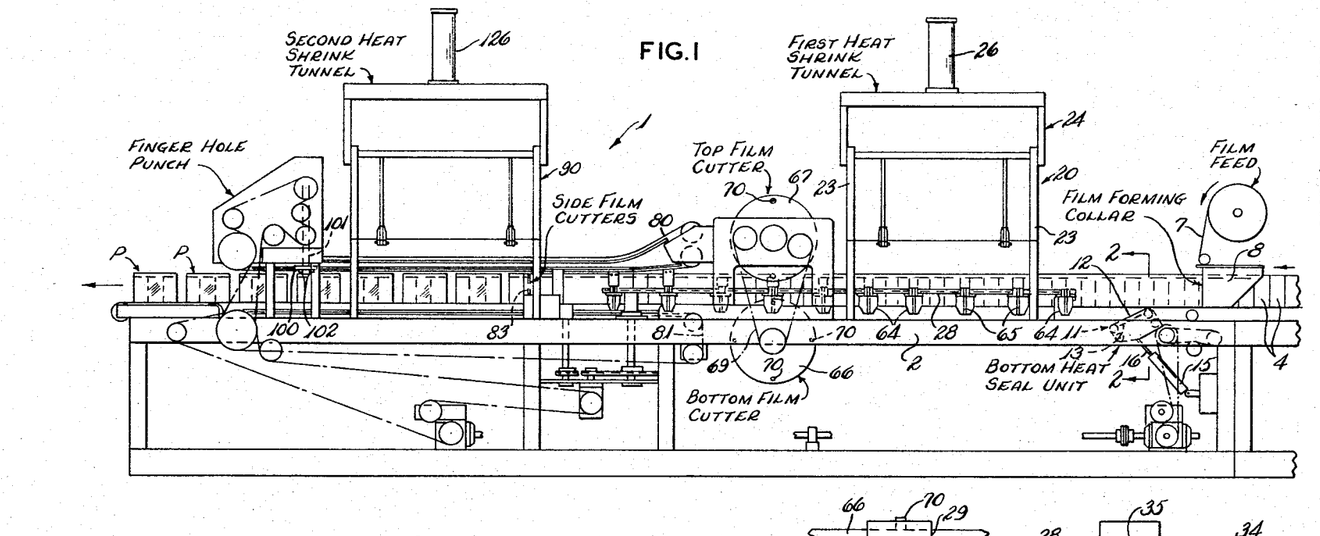
FIG. 1 is a fragmentary side elevation of a portion of the apparatus embodying the principles of the invention for use in package forming and heat shrink banding actions.
Figure 3:
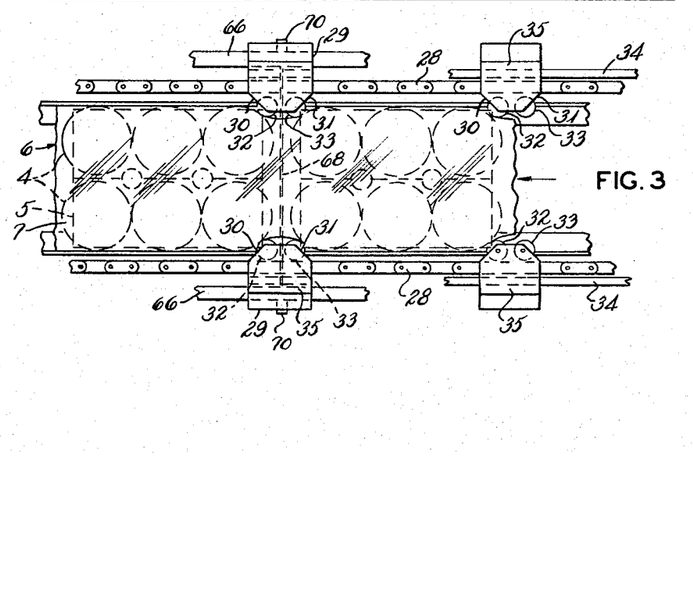
FIG. 3 is a fragmentary enlarged plan view of articles being packaged, taken at the first cutting means used in the apparatus for starting to sever an elongate plastic tube, or enclosure into longitudinally spaced sections.

FIGS. 1 and 3 of the drawings best show that a conveyor 28 is provided adjacent each side of the frame 2 and moves longitudinally thereof to move the articles through the heat shrink tunnel 20. These conveyors 28 are formed from chain links, usually, and they include inwardly extending lugs or arms 29 thereon at longitudinally spaced portions of the conveyor. Such arms 29 have tapered upstream and downstream edges as indicated at 30 and 31 in FIG. 3, and these arms are so positioned by the conveyors 28 that the arms 29 extend in from opposed margins of the streams of articles 4 being fed through the apparatus so that such arms cause the articles to be spaced longitudinally from each other in groups, as shown in FIG. 3. Such action actually occurs at the upstream end of the conveyor 28 where the introduction of the arms 29 between the abutted articles causes the tube of film 6 to move longitudinally with relation to the articles and provide excess film extending between the groups of articles formed in the apparatus.

To aid in obtaining the desired separation action for the articles 4 so as to divide them into longitudinally spaced groups, the arms 29 each have a pair of spaced rolls 32 and 33 suitably journalled thereon at the margins of the tapered edges 30 and 31 on each of the arms 29 to facilitate low friction engagement between a pair of abutted articles and to facilitate drawing the tube of plastic film longitudinally and aid in the desired separating action on the articles. Preferably this linked conveyor 28 is supported on associated side bars 34 as shown in FIG. 3, and these bars extend horizontally and engage with overhanging flanges 35 provided on the laterally outer margins of the arms 29. This aids in maintaining the conveyors 28 in a fixed path for desired grasp and transmission of the articles 4 through the apparatus.

It will be realized that the heat shrink tunnel 20 can be made of any desired longitudinal extent, dependent upon the heat shrink characteristics of the film being processed, the temperature of the tunnel, and the speed of movement of articles through the tunnel, etc. The tunnel 20 is shown of a longitudinal extent to include at least three groups of the articles 4 therein at any one time for heat shrink action on the plastic film on the portion thereof then in the tunnel 20 as the plastic film and articles are moved through the tunnel. FIG. 6 of the drawings best shows that the outer wall 22 of the tunnel preferably is made from insulating material or has suitable insulation means associated therewith. The lower edges of the inner wall 21 and the outer wall 22 are connected to each other by bottom plates 36, suitably secured to the walls whereby an enclosed air space is provided between the adjacent surfaces of the inner and outer walls 21 and 22, respectively. Any suitable heated air circulating means can be provided directly within the heat shrink tunnel 20, or operatively connected thereto whereby heated air can be forceably circulated in association with the tunnel 20 and be discharged therefrom to heat the contents of the tunnel for heat shrink action thereon.

Figure 11:
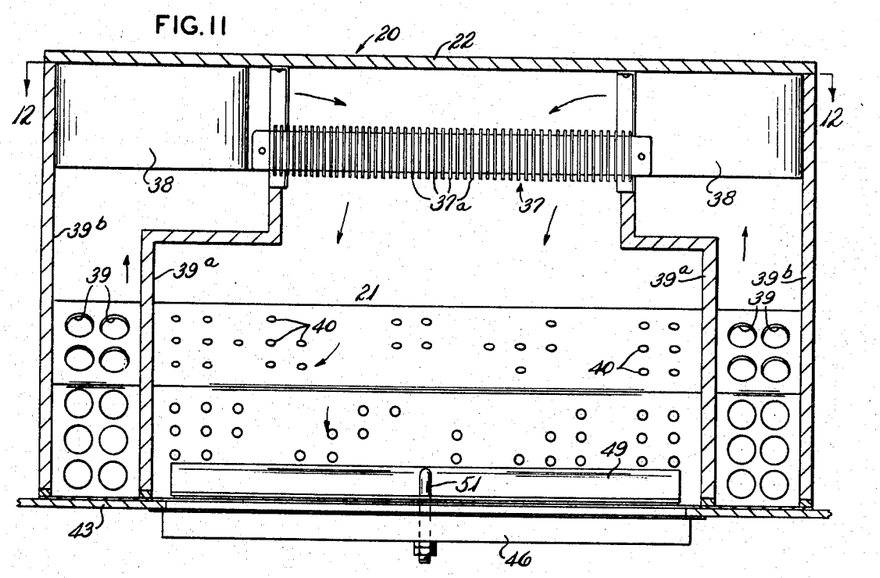
FIG. 11 is a fragmentary vertical section taken on the longitudinal axis of the shrink tunnel shown in FIG. 6.
Figure 12:
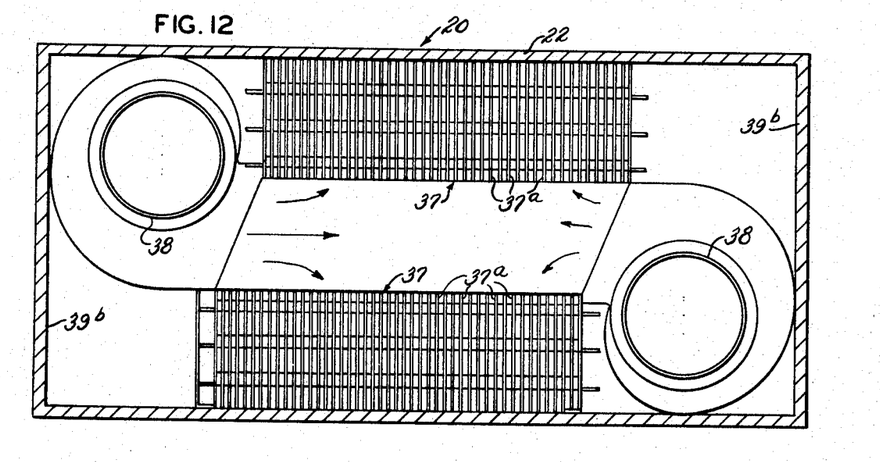
FIG. 12 is a horizontal section taken on line 12—12 of FIG. 11.

FIGS. 6, 11 and 12 best show some of the details of suitable heater elements and air circulation means that preferably are provided in each of the heat shrink tunnels of the invention. A plurality of elongate electrically heated heater elements, or electrical heaters 37 are shown with each of such elements comprising an elongate bar that has a plurality of fins or plates 37a secured thereto and extending therefrom for convenient air flow thereover for transmission of heat to the circulated air. Preferably a plurality of the heater elements 37 are positioned in parallel relation adjacent each lateral margin of the heat shrink tunnel and are adjacent the outer wall 22 of the heat shrink tunnel above and spaced from the upper surface of the inner wall 21. A suitably driven fan 38 is also shown adjacent each end of the heat shrink tunnel 20. These fans 38 have relatively short downwardly extending inlets 38a associated therewith for drawing air upwardly from the space between the walls 21 and 22 of the tunnel at the end portions thereof into the fan for distribution longitudinally inwardly of the heat shrink tunnel. The air from the fans 38 is caused to flow over the electric heaters 37 and downwardly therethrough towards the apertured inner tunnel wall 21. Any suitable thermostat means or similar controls (not shown) can be connected to the electric heaters 37 to control the power supply therefor so that the heaters are maintained at a desired temperature, dependent upon the temperature regulation desired for the air circulated through the tunnel. Naturally these thermostats can be controlled by the temperature of the air within the tunnel 20, if desired, and the air circulated through the tunnel 20 can be maintained, for example, at approximately 350° F. to provide a prompt and effective heat shrink action on local sections of the plastic film 7 in the tunnel. Naturally the heating of the air may be varied dependent upon the type of film used, the conveyor speed, etc.

The fans 38 are adapted to draw air thereinto from apertures 39 in the end sections of the inner wall 21, which air has primarily been previously heated and circulated through the heat shrink tunnel. These apertures 39 usually are relatively large and partitions 39a separate the apertured end sections of the inner wall from the center section thereof. The partitions 39a extend from the inner wall 21 up to the inlets 38a for the fans whereby such air is pulled into the fans for reheating and recirculation action thereon. As air is forced downwardly past the electric heaters 37, some of such air flows downwardly to the inner tunnel wall 21 and through a plurality of apertures 40, usually of relatively small diameter, formed in the center section of the inner tunnel 21. Thus the air flowing down through the holes 40 flows against the top and sides of any package and film received within the tunnel for prompt and effective heat shrink action on the film. Other air between the tunnel walls 21 and 22 is moved downwardly of the tunnel to aid in heating the bottom portions of the articles and film positioned thereover of all articles received within the heat shrink tunnel, all as hereinafter described in more detail. Of course, the ends of the inner wall 21 are open and cover plates 39b are suitably secured to and extend between the inner and outer walls 21 and 22 at the ends thereof.

FIG. 6 further shows that a plurality of any suitably sized holes or apertures 41 are formed in the bottom plate 36 at longitudinally spaced portions thereof, and these apertures are adapted to register with correspondingly shaped holes or apertures 42 that are formed in a support or plate 43 that is suitably carried by the frame 2 at the lower end of the heat shrink tunnel 20 for support of the tunnel or engagement therewith when the tunnel is operatively positioned in association with the conveyor 28. FIG. 6 shows how the conveyor 28 moves a group of the articles through the heat shrink tunnel. At that time, the articles are suitably carried upon, or supported by a pair of parallel longitudinally extending bars or rods 44 and 45 so that, as the conveyor 28 engages with the sides of these articles 4, they will be moved at a controlled speed through the tunnel 20. The drawings clearly show that a bottom enclosure 46 is suitably secured to the lower surface of the support or plate 43 and that it extends between the sets of holes 42 provided on opposite sides of the rods 44 and 45 to receive heated air as forced from the tunnel 20 so that such heated air can flow down into the enclosure 46 and then be discharged upwardly through a cover 47 secured to and carried by the support plate 43 intermediate the sets of holes 42 provided therein so that such cover 47 is positioned immediately below the rods 44 and 45 and has a plurality of holes 48 formed therein. Hence, heated air can be discharged through the holes 48 for contact with the bottom and side portions of the articles and plastic film being moved along the rods 44 and 45 to effect a rapid heat shrink action thereon.

As a protective feature of the apparatus of the invention, a pair of shut-off plates 49 are usually hingedly secured to the inner surface of the bottom plates 36, which plates 49, as shown in FIG. 6, extend between the inner walls 21 and outer walls 22 of the tunnel 20. The plates 49 have edge flanges 50, or other means thereon, whereby the plates 49 are normally so positioned in the heat shrink tunnel that they swing downwardly of the tunnel and will lie against or abut on the top surface of the bottom plates 36, to cover the holes therein. When the tunnel 20 is operatively positioned, as shown in FIG. 6, the bottom enclosure 46 has a plurality of means such as pins or fingers 51 secured thereto and extending upwardly therefrom through the holes 42 in the support plate 43 and naturally registering with the holes 41 in the bottom plate 36 of the tunnel. Hence, when the tunnel is operative, the covers or plates 49 are maintained in raised positions, but as soon as the tunnel 20 is elevated out of operative association with the support plate 43, the covers or plates 49 will swing automatically down to close the holes 41 and prevent flow of the heated air out of the lower end of the tunnel to maintain the temperature of the air in the tunnel and also to prevent this heated air from blasting against any plastic film and articles associated with the tunnel when it is raised so as to prevent undesirable heating action thereof. If desired, the covers 49 can be spring actuated, or be otherwise controlled so that they will move automatically to closed positions when the tunnel is elevated.

*Tunnel closing means*

As an important feature of the present invention, the heat shrink tunnel 20 is not only mounted for vertical movement to and from operative association with the conveyor 28 and articles positioned thereon, but the tunnel is also adapted to be substantially sealed or closed when raised to its inoperative position. Thus the upper frame or cover 24 includes ends 24a that will lie closely adjacent and substantially seal or close the ends of the tunnel 20 when it is raised as the cover 24 is equipped with end plates 24a at each end thereof that will lie closely adjacent the open ends of the tunnel 20 when it is elevated, and is adapted to register with and close the openings in the tunnel through which the articles 6 are moved. Thus, a pair of bottom flaps 52 and 53, FIG. 5, are operatively associated with the heat shrink tunnel 20 and are carried, for example, on L-shaped support arms 54, a plurality of which engage with each of the bottom flaps 52 and 53 at longitudinally spaced portions thereof. These arms 54 are pivotally positioned on means such as shafts 55, one of which is positioned adjacent each lateral margin of the heat shrink tunnel 20 and is suitably journalled at its ends on the cross arms or bars 25 provided in the support means for the heat shrink tunnel 20.

Movement of the L-shaped arms 54 and hence the positioning of the bottom flaps 52 and 53 is controlled by means of cams 56 one of which is secured to each of the L-shaped arms 54 on the inner surface thereof and with such cam 56 being engageable with a vertically extending cam plate 57 one of which is secured to the outer surface of the outer wall 22 of the tunnel 20 at suitably spaced portions thereof for engaging the cams 56 upon relative vertical movement of the tunnel 20 with relation to the arms 23 and cover 24 for the tunnel. The cam plates 57 have suitable cam surfaces 58 thereon that, when the tunnel is in its elevated position, enable the L-shaped arms 54 to move the bottom flaps 52 and 53 into their closed positions under and abutting against the lower end of the heat shrink tunnel 20 to extend the length thereof. It will be seen that the bottom plate 52 has a little lip or flange 59 on one end thereof and that the other bottom flap 53 will abut thereagainst to form the desired closure with an overlapped portion between the bottom flaps 52 and 53 when operatively positioned.

Normally the bottom flaps 52 and 53 are resiliently urged continually to their innermost or operative positions. Such biasing on the bottom flaps is provided, for example, by a plurality of coil springs 60 that are individually telescoped over and carried by rods 61 the upper ends of which engage with, slidably, and extend through suitable holes provided in a control or positioning bar 62 secured to and extending between the arms 23 laterally outwardly of the support shafts 55, with one end of each of the coil springs 60 normally seated on and bearing against the bar 62 and being urged, under compression action, to tend to move an attachment sleeve or clevis 63 inwardly of the apparatus. One of the clevises 63 is suitably pivotally attached to each of the L-shaped arms 54 on the laterally outer margin thereof, and with the rods 61 also being engaged with the clevises 63 so that closing forces are set up on these bottom flaps at all times. An adjustable nut 161 engages each rod 61 and the spring 60 seats thereon. However, when the tunnel 20 starts to move downwardly, the cams 56 engage the cam plates 57 and are started to be moved outwardly to swing the L-shaped arms 54 and the bottom flaps laterally outwardly of the apparatus. Such opening movement of the flaps may be continued by the lower end of the tunnel aiding in the final outward movement of the flaps because of the angular relationship of the flaps and lower end of the tunnel, and the positioning of the arms 54, so that the complete opening action can be readily effected by the tunnel lower end forcing the bottom flaps to their fully opened positions, as indicated in FIG. 5.

As the plastic tube 6 and articles 4 are moved through the preliminary heat shrink tunnel 20, the plastic film 7 in the tube is heat shrunk into fairly tight engagement with the articles 4, but with such tube still being in a continuous elongate form and extending between spaced groups of the articles positioned therein.

*Film cutting action*

After the groups of articles moved along by the conveyors 28 have passed from the tunnel 20, if desired, a blast of cooling air can be blown against the plastic film by suitable means (not shown) to prevent any additional heat shrink action thereon at this time. In all events, the conveyor 28 has downwardly extending lugs, controls, or plates 64 suitably secured thereto in association with the arms 29 on the conveyor. These controls or plates 64 can be made from any suitable material and they have a vertically extending slot 65 formed therein extending upwardly of the control from the lower edge thereof for a major distance along the height of such control. FIG. 1 of the drawings shows that a bottom film cutter or drum 66 is provided adjacent and below the conveyor 28 and with a top film cutter or drum 67 being positioned above such conveyor 28. Preferably each of these cutter drums comprises a pair of laterally opposed discs that have transversely extending conventional cutter wires or bars (not shown) secured thereto at accurately spaced peripheral portions thereof. These cutter wires or bars 68 have suitable electrical power supply means connected thereto in any conventional manner and they are heated to a temperature for convenient cutting or melting action on any portions of the plastic film 7 with which they engage. FIG. 1 also clearly shows that a chain 69 can connect the lower cutter drum 66 to the upper cutter drum 67 for fixed drive relationship therebetween.

The cutter drum 66 also includes suitable studs 70 that are secured to the laterally outer margins of the drums, normally in alignment with the cutter wires or bars 68, and such studs are so spaced circumferentially of the drums in relation to the longitudinal spacing of the controls or plates 64 on the conveyor 28 that one of the studs 70 will be engaged in one of the slots 65 with longitudinal movement of the conveyor past the drum. Such action causes rotation of the lower drum 67 and in turn drives the upper cutter drum 67 through the chain 69 whereby controlled rotary action of the cutters in relation to longitudinal movement of the conveyor 28 is provided and the cutters or wires 68 will then engage the tube 6 of the plastic film 7 intermediate each of the groups of articles 4 formed therein and being processed in the apparatus. The relative positioning of the cutter drums 66 and 67 in relation to the articles on the conveyor 28 is such that the tube 6 will be cut completely across its upper and lower surfaces and with the cuts extending slightly vertically into the lateral portions of the tube, such as about one inch, in most instances, in substantially accurately or centered relationship to the spacing between each of the groups of articles within the plastic tube 6. As the cooled plastic tube has not been completely cut into sections by the action of the cutter drums 66 and 67, the continuous longitudinally extending portions of the plastic film will aid in retaining the cut film portions extending longitudinally beyond the articles 4 grouped together in the apparatus. This aids in the ultimate provision of an effective, compact, tightly held package assembly by the apparatus and method of the invention.

Secondary film cutting action

Figure 4:
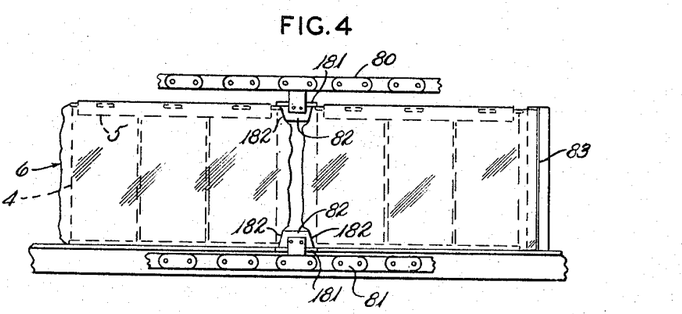
FIG. 4 is a fragmentary enlarged elevation of packages being processed in, or moved through the second heat shrink tunnel of the apparatus.

After the articles have been moved longitudinally beyond the plastic film cutter drums 66 and 67, then a further and upper conveyor 80 is brought into engagement with the upper portions of the articles 4 and the plastic film 7 thereon, whereas a bottom conveyor 81 is positioned to engage the lower surfaces of the articles 4 and the plastic film passing therearound to move the articles in the apparatus. FIG. 1 clearly brings out that the conveyors 80 and 81 longitudinally overlap the conveyor 28 to engage the plastic film and the articles being processed prior to release thereof from the conveyor 28. Each of the conveyors 80 and 81, FIG. 4, comprises a link chain endless band that has a plurality of inwardly extending clamps, or guides 82 secured thereto. Such guides or clamps 82 have suitable means associated therewith such as silicone rubber flanges 181 that are adapted to engage the cut end portions of the plastic film 7 adjacent each end of the groups of articles 4 formed in the apparatus and retain such plastic film edge in contact with the end cans or containers in the apparatus. The clamps 82 also maintain the cans in compact groups by tapered edges 182 that may wedge between adjacent end cans or containers.

Continued movement of the plastic film and articles longitudinally of the apparatus moves the plastic film tube 6 past a suitable cutter wire or bar 83, one of which is positioned adjacent each lateral margin of the fixed path through which the articles and film are being moved in the apparatus. These cutter bars 83 extend vertically for at least the height of the film being processed. Each cutter bar 83 is positioned in the manner shown in FIG. 13 and is secured at each end to a horizontal control arm 84 one of which is provided for each end of the cutter bar 83 for support thereof. The control arms 84 are in turn controlled by means of a pair of cranks 85 and 86 that are suitably journalled on the frame 2 of the apparatus of the invention. Preferably the crank arm 86 is carried by a driven shaft 87 whereby these cranks 86 cause the unit supporting the cutter bar 83 to be rotated through a circular path and with the arc end position of the cutter bar 83 being such that it will bear against and move with the continuous lateral margins of the plastic tube 6 as it is being moved in the apparatus of the invention. As the path of the cutter bar 83 intersects the path of the plastic film band 6, a relatively rapid and effective cutting action is performed on the lateral margins of the plastic band or tube whereby the plastic tube is cut into sections at longitudinally spaced portions thereof. The cuts are accurately controlled by the size and positioning of the cranks 86 and 85 whereby they are made automatically between each of the groups of articles being formed into packages in the apparatus of the invention.

Second heat shrink tunnel

Figure 7:
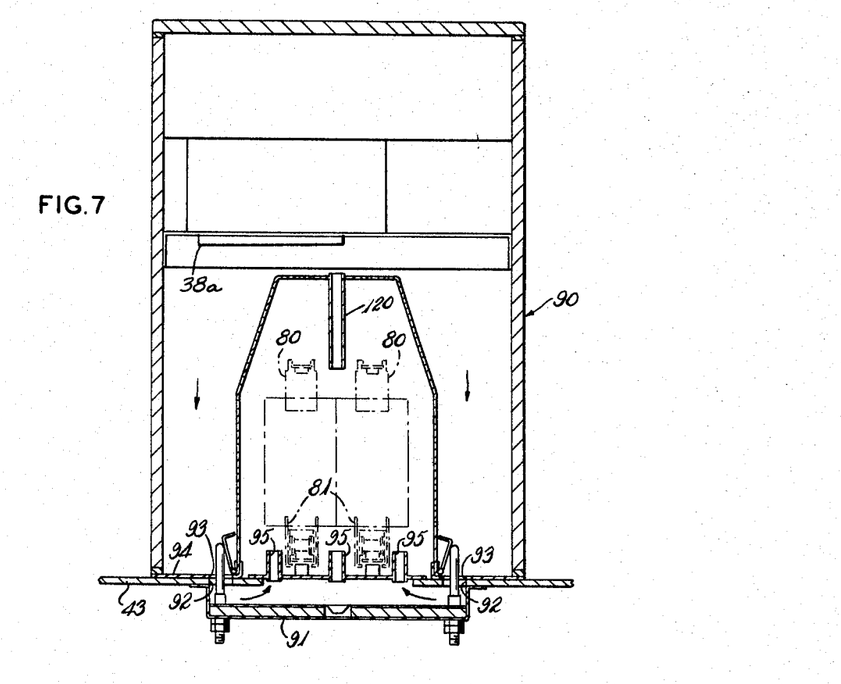
FIG. 7 is a fragmentary vertical section taken through the second heat shrink tunnel of FIG. 1 and its associated support means.
Figure 8:
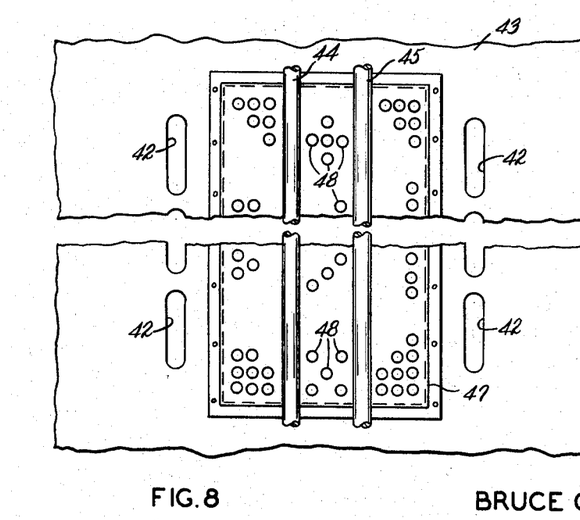
FIG. 8 is a fragmentary plan of a portion of the support means shown in FIG. 6 for use in association with the first heat shrink tunnel.

FIG. 7 of the drawings best shows a second heat shrink tunnel 90 that is of generally similar construction, positioning, and action to the heat shrink tunnel 20. However, in this instance, the articles 4 are supported on and between the conveyors 80 and 81 which are retaining the end portions of the plastic film sections in tight engagement with the ends, top and bottom edges of the end articles in the groups being processed. Suitable heated air circulating means (not shown) are provided in the upper portion of the heat shrink tunnel 90 and circulate heated air therethrough including passage down to a bottom enclosure 91 through any suitable apertures 92 formed in this portion of the support plate 43 and registering with corresponding apertures 93 in a lower end or bottom plate 94 provided between the spaced inner and outer walls of the tunnel 90. In this instance, upwardly extending discharge tubes 95 are provided in association with the enclosure 91 to aid in directing a blast of hot air up against the bottom, and for flow along the side portions of the package being formed in the apparatus. Suitable means such as a cylinder 126 and piston rod (not shown) controlled thereby raise and lower the tunnel 90 the same as for the tunnel 20.

The heat shrink action effected in the tunnel 90 completes the shrinking of the main enclosure band into tight engagement with the top member 5 and the articles 4 forming one package in the package forming apparatus of the invention, and this second heat shrink action further draws the end portions of the plastic film or band into tight engagement with the end portions of the end cans and some side areas of these cans as they move through the apparatus. As the apparatus of the invention is particularly adapted for forming package enclosures of the general type shown in U.S. Patent No. 3,118,537, or in my copending application Ser. No. 425,037, filed Jan. 12, 1965, now Patent No. 3,302,734, the apparatus normally includes a suitable finger hole punching means 100 that is located downstream of the second heat shrunk tunnel 20. This finger hole punch means comprises any suitable member that is adapted for vertical reciprocation at controlled intervals, and thus a ram 101 is shown that has two punches 102, only one of which is shown, provided at the lower end thereof whereby such means can be brought into engagement with the packages being moved through the apparatus and cut slits or holes in the plastic film band enclosing the package of articles formed in the apparatus.

Figure 10:
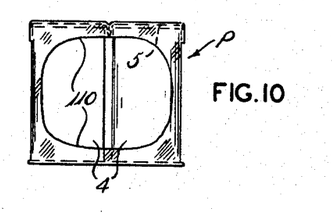
FIG. 10 is an end elevation of a package produced in the apparatus of the invention.

FIG. 10 shows an end elevation of a package P formed by the apparatus. It shows ends 110 of the film engaging upper and lower portions of the end articles in the package.

It will be realized that any suitable drive can be provided in the apparatus of the invention, but preferably a unitary drive control is present so that the entire feed of cans to the apparatus and movement of the cans or articles through the apparatus can be controlled by one member. When the article feed is stopped, a means that controls the cylinders 26 and 126 in the apparatus would be actuated, whereby the heat shrink tunnels 20 and 90 would be raised and the bottom areas thereof would be sealed. Normally the heaters and fans in the tunnels would still be operative whereby the tunnels can be maintained at predetermined temperatures and be ready for instantaneous operation as soon as the start button is pushed for the apparatus, which would actuate the cylinders 26 and 126 and bring the heat shrink tunnels down into operative positions.

Figures 9, 13:
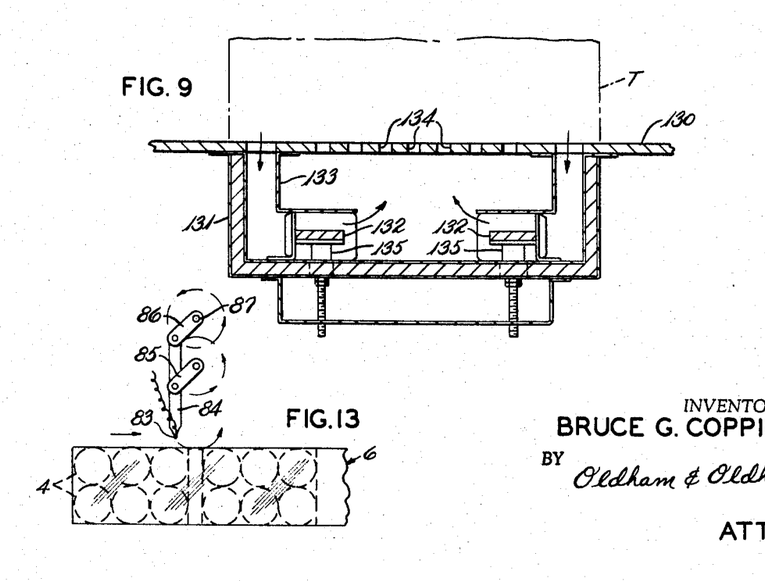
FIG. 9 is a fragmentary vertical section of a modification of a support means or base unit for use in association with either of the heat shrink tunnels shown in FIGS. 6 and 7.
FIG. 13 is a fragmentary plan showing details of a side cutting means and associated drive means used in the apparatus of the invention.

If it is found that the provision of air in bottom enclosures associated with the tunnels 20 and 90 is not maintained at a sufficiently high temperature, then auxiliary heat supply means can be built into the enclosure means associated with the supports for the articles being moved through the heat shrink tunnels. FIG. 9 of the drawings shows a support plate 130 that has a bottom enclosure 131 associated therewith for receipt of at least partly heated air from an associated tunnel indicated at T to feed partially heated air to this enclosure. The bottom enclosure, which may be insulated, for either, or both, of the heat shrink tunnels, includes a plurality of longitudinally extending heater elements 132 of any conventional construction. Air is adapted to be brought into the enclosure 130 through suitable means such as narrow longitudinally extending ducts 133 that causes the air to move over the heaters 132 before the air is available for discharge through apertures 134 formed in the plate 130. Any desired thermostat controls 135 can be associated with the heaters and/or air passing through the enclosure 130 to regulate the operation thereof. Air passes upwardly from the enclosure to be forced therefrom up into engagement with the lower portions of articles being processed in and moved through the apparatus of the invention.

In view of the above, it is believed that a novel and improved apparatus and method have been provided for packaging and heat shrinking plastic film covers into engagement with a series of articles. Such action by the new process and apparatus has end sections of plastic film bands tightly gripping the end articles to form an attractive, durable, compact package assembly therefrom. The groups of articles are positively moved through the apparatus by driven conveyor means, such as the pair of conveyors 28, 28 that move the articles initially. Then the conveyors 80 and 81, which have any suitable return courses, engage the articles for controlled further movement along a fixed path. FIG. 7 shows that the conveyor 81 includes two transversely spaced sections to engage and support the articles being processed. Such conveyor sections may each have the members 82 separately secured thereto or the members 82 may be common to both sections and connect them into conveyor units. In all events, any suitable conveyors may be used but use of the arms 29 and members 82, or equivalents on the conveyors is necessary for practice of the invention. The ram 101 and punches 102, or equivalents, form slits in the film normally in register with finger receiving sections of the top members 5, which may be of any suitable construction. The apparatus functions rapidly and efficiently to form sturdy packages whereby the objects of the invention are realized.

While at least one complete embodiment of the invention has been disclosed herein, it will be appreciated that modification of this particular embodiment of the invention may be resorted to without departing from the scope of the invention as defined in the appended claims.

What is claimed is:

1. A method of packaging articles in a transparent heat shrunk plastic film enclosure where a stream of abutted upright articles is fed along a fixed path and a continuous strip of the plastic film is formed into a tube to enclose such articles in the stream loosely by having its edges overlapped around the articles, continuously sealing the overlapped edges of the film together as the film and articles are moved through a fixed path, separating the articles in the moving stream into spaced groups and simultaneously moving the film relative to the articles so that spaced groups of articles are positioned within a continuous tube of film, the steps of
   heating the tube of film to shrink it into engagement with its associated articles,
   cutting the tube of film on its top and bottom portions intermediate the groups of articles,
   retaining the film to the top and bottom of its associated articles,
   cutting the opposed sides of said film intermediate the groups of articles to sever the film into sections, and
   heating said film sections to shrink end portions thereof into tight engagement with end portions of said groups of articles.

2. In a method of packaging articles in a transparent heat shrunk plastic film enclosure where a stream of abutted articles is fed along a fixed path and a continuous strip of a plastic film tube is positioned loosely around the articles, the steps of
   separating the articles in the moving stream into longitudinally spaced groups and simultaneously moving the tube of film relative to the articles so that spaced groups of articles are positioned within a continuous tube of film, and
   heating the tube of film locally to shrink it into engagement with its associated articles.

3. Heat shrink apparatus for use in securing a tube of plastic film to articles enclosed within the tube where groups of articles are received within a continuous tube of the film and where the articles and tube can be continuously moved through the apparatus which comprises
   a heat shring tunnel through which the tube and articles are moved,
   air heating and circulating means connected to said tunnel,
   said tunnel having spaced outer and perforated inner walls connected at their lower ends and openings to the atmosphere at the lower ends of said walls from the space therebetween, said air circulation means being connected to the space between said walls,
   support means for said tunnel, which support means have a plurality of apertures therein registering with the openings at the lower end of said tunnel walls,
   means mounting said tunnel and positioning it for vertical movement to and from engagement with said support means,
   cover means for said openings in said tunnel pivotally positioned in said tunnel for movement to and from a normal position closing said openings,
   means associated with said support means to open said cover means when said tunnel engages said support means,
   air duct means in said support means to receive air from said tunnel and distribute it to the bottom area of said tube and articles as they are moved through said tunnel, and
   heating means in said support means to heat air passing therethrough.

4. Heat shrink apparatus for use in securing a tube of plastic film to articles enclosed within the tube where groups of articles are received within a continuous tube of the film and where the articles and tube can be continuously moved through the apparatus which comprises
   a heat shrink tunnel through which the tube and articles are moved,
   air circulating means connected to said tunnel,
   said tunnel having spaced outer and perforated inner walls connected at their lower ends and openings to the atmosphere at the lower ends of said walls from the space therebetween and openings in an upper portion of said inner walls, said air circulation means being connected to the space between said walls,
   support means for engaging the lower end of said tunnel, which support means has a plurality of apertures therein registering with the openings at the lower end of said tunnel walls,
   means mounting said tunnel and positioning it for vertical movement to and from engagement with said support means,
   cover means for said openings in said tunnel pivotally positioned in said tunnel for movement to and from a normal position closing said openings, and means associated with said support means to open said cover means when said tunnel engages said support means.

5. Heat shrink apparatus for use in securing a tube of plastic film to articles enclosed within the tube where groups of articles are received within a continuous tube of the film and where the articles and tube can be continuously moved through the apparatus which comprises
 a heat shrink tunnel through which the tube and articles are moved,
 air circulating means connected to said tunnel,
 said tunnel having spaced outer and perforated inner walls connected at their lower ends and openings to the atmosphere at the lower ends of said walls from the space therebetween, said air circulation means being connected to the space between said walls and to the interior of said tunnel,
 support means for said tunnel, which support means have a plurality of apertures therein registering with the openings at the lower end of said tunnel walls, and means mounting said tunnel and positioning it for vertical movement to and from engagement with said support means,
 cover means for the lower end of said tunnel pivotally positioned for movement to a position closing said lower end of said tunnel,
 means associated with said support means to open said cover means when said tunnel is lowered, and
 air duct means operatively connected to said support means to receive air from the lower ends of said tunnel and distribute it to the bottom area of said tube and articles as they are moved through said tunnel.

6. Heat shrink apparatus for use in securing a tube of plastic film to articles enclosed within the tube where groups of articles are received within a continuous tube of the film and where the articles and tube can be continuously moved through the apparatus which comprises
 a heat shrink tunnel through which the tube and articles are moved,
 heating means carried by said tunnel,
 air circulating means carried by said tunnel,
 said tunnel having spaced inner and outer walls and openings to the atmosphere at the lower ends of said walls from the space therebetween, said air circulation means connecting to the space between said walls and to the interior of said tunnel,
 support means for said articles as moved through said tunnel,
 frame means adjacent said tunnel to support it for operative action and having a plurality of apertures therein registering with the openings at the lower end of said tunnel walls, and
 air circulation duct means in said frame means to receive heated air from said tunnel and distribute it to said support means and the bottom area of said tube and articles.

7. Heat shrink apparatus for use in securing a tube of plastic film to articles enclosed within the tube where groups of articles are received within a continuous tube of the film and where the articles and tube can be continuously moved through the apparatus which comprises
 a heat shrink tunnel through which the tube and articles are moved,
 air circulating means connected to said tunnel,
 said tunnel having spaced inner and outer walls connected at their lower ends and opening to the atmosphere at the lower ends of said walls from the space therebetween, said inner walls having openings therein, said air circulation means connecting to the space between said walls,
 support means for said tunnel, which support means has a plurality of apertures therein registering with the openings at the lower end of said tunnel walls,
 means mounting said tunnel for vertical movement from engagement with said support means to a position thereabove,
 air duct means in said support means to receive air from said tunnel and distribute it to the bottom area of said tube and articles as they are moved through said tunnel, and
 heating means in said support means to heat air passing therethrough.

8. Heat shrink apparatus for use in securing a tube of plastic film to articles enclosed within the tube where groups of articles are received within a continuous tube of the film and where the articles and tube can be continuously moved in a fixed path through the apparatus which comprises
 a heat shrink tunnel through which the tube and articles are moved,
 control and support means above said tunnel and mounting said tunnel for vertical movement to and from association with said tube and articles,
 heating means carried by said tunnel,
 air circulating means carried by said tunnel,
 means carried by said control and support means for closing the ends of said tunnel when it is elevated,
 closure flaps for the bottom of said tunnel pivotally positioned on said control and support means adjacent the sides of said tunnel, and
 means for moving said closure flaps to operative position covering the bottom of said tunnel, when elevated, connected to said flaps.

9. Heat shrink apparatus for use in securing a tube of plastic film to articles enclosed within the tube where groups of articles are received within a continuous tube of the film and where the articles and tubes are continuously moved through the apparatus by driven means which comprises
 a heat shrink tunnel through which the tube and articles are moved,
 means mounting said tunnel for vertical movement to and from association with said tube and articles so that said tunnel can be elevated when the drive for said tube and articles is stopped,
 air circulating and heating means operatively connected to said tunnel to circulate heated air therethrough,
 cover means positioned above said tunnel for closing the ends of said tunnel when it is elevated,
 closure flaps for the bottom of said tunnel operatively positioned adjacent said cover means and positioned adjacent and above said tunnel when associated with said tube, and
 means connected to said closure flaps for moving them to operative positions covering the bottom of said tunnel when it is elevated whereby said tunnel can be maintained at a set temperature for immediate heat shrink action as soon as it is lowered to enclose the tube and articles.

10. Apparatus as in claim 9 where a second heat shrink tunnel is provided downstream of said first tunnel, means are present to cut the film into bands enclosing a group of said articles, and other driven conveyor means are present to engage portions of said plastic film bands and press them against top and bottom portions of the grouped articles before such group and film moves through said second heat shrink tunnel.

11. Heat shrink apparatus for use in securing a tube of plastic film to articles enclosed within the tube where groups of articles are received within a continuous tube of the film and where the articles and tube can be continuously moved through the apparatus which comprises
 a heat shrink tunnel through which the tube and articles are moved,
 air circulating means positioned in said tunnel,
 heating means in said tunnel and over which air is circulated,
 said tunnel having spaced outer and perforated inner walls connected at their lower ends and openings in said inner wall for the length thereof, and partition means extending transversely of said tunnel adjacent each end thereof between said inner and outer walls to divide said inner wall into end sections and a center section, said air circulation means connecting to the space between said walls for intake through said inner wall end sections and for discharge over said heating means to the center section of said inner wall.

12. Apparatus for use in securing a tube of heat shrinkable plastic film to articles enclosed within the tube where groups of abutted articles are received within a continuous tube of the film, which apparatus comprises driven conveyor means engaging the articles and film and moving them through a fixed path with the articles retained in longitudinally spaced groups, a heat shrink tunnel through which the tube and articles are moved by said conveyor means, upper and lower cutter drums each provided with transversely extending, circumferentially spaced cutter means positioned above and below said conveyor means, means engaging said cutter drums and extending therebetween for unitary movement thereof, drive means for said cutter drums for driving them in timed relation to movement of said conveyor means, said cutter drums being positioned to cut longitudinally spaced opposed top and bottom portions at least of said plastic film tube by said cutter means on rotation of said cutter drums, cutter means for the side portions of said plastic tube, means mounting said cutter means for movement in circular paths intersecting the path of said plastic film to cut the side portions thereof, and a second heat shrink tunnel through which the cut sections of said film and said groups of articles are next passed.

13. A method of packaging articles in a transparent heat shrunk plastic film enclosure where a stream of abutted upright articles is fed along a fixed path and a continuous strip of the plastic film is formed into a tube to enclose such articles in the stream loosely by having its edges overlapped at the bottoms of the articles, continuously sealing the overlapped edges of the film together as the film and articles are moved through a fixed path, the articles in the moving stream being rearranged into spaced groups, the steps of heating the tube of film at a section thereof to shrink it into engagement with its associated articles as the articles and film move along a fixed path, pressing portions of the film against at least portions of the tops and bottoms of the end articles in the groups being processed.

cutting said film intermediate the groups of articles to sever the film into sections, and heating said film sections to shrink said film into tight engagement with said groups of articles.

14. A method of packaging articles in a transparent heat shrunk plastic film enclosure where a stream of abutted articles is fed along a fixed path and a continuous tube of plastic film encloses such articles, the film and articles being moved through a fixed path, the articles in the tube being rearranged into spaced groups, the improvement comprising the steps of heating the tube of film as it moves along a portion of its path to shrink it into engagement with its associated articles, retaining portions of the film against portions of the top and bottom edges of the end articles in the groups of articles being packaged, severing said film intermediate the groups of articles to form the film into tubular sections protruding beyond the groups of articles at each end thereof, and heating the secured individual film sections to shrink the film into final tight engagement with the group of articles enclosed thereby and to draw end portions of the film sections into engagement with portions of the side walls of end articles.

15. Apparatus for use in securing a tube of plastic film to articles enclosed within the tube where abutted articles are received within a continuous tube of the film and where the articles and tube are continuously moved through the apparatus which comprises driven conveyor means with longitudinally spaced means thereon for engaging said articles to separate them into longitudinally spaced groups and to move the plastic tube longitudinally of the supplied stream of articles, the improvement comprising a frame, a heat shrink tunnel through which the tube and articles are moved operatively associated with said frame, means mounting said tunnel for vertical movement to and from association with said tube and articles, air circulating means carried by said tunnel for circulating air therethrough, plate means positioned on said frame for closing the ends of said tunnel when it is elevated, closure means for the bottom of said tunnel movably positioned at the lower end of said tunnel, means carried by said frame for moving said closure means to operative position to cover the bottom of said tunnel, when elevated, connected to said closure means, and cutting means carried by said frame and driven in timed relation to movement of said plastic tube and the articles therein for cutting said plastic tube into individual sections each one of which encloses a group of said articles.

16. Apparatus for use in securing a tube of plastic film to articles enclosed within the tube where abutted articles are received within a continuous tube of the film and where the articles and tube are continuously moved through the apparatus which comprises driven conveyor means with longitudinally spaced means thereon for engaging said articles to separate them into longitudinally spaced groups and to move the plastic tube longitudinally of the supplied stream of articles, the improvement comprising a frame, a heat shrink tunnel through which the tube and articles are moved operatively associated with said frame, means mounting said tunnel on said frame for vertical movement to and from association with said tube and articles, closure means for the bottom of said tunnel movably positioned at the lower end of said tunnel, means for moving said closure means to operative position to cover the bottom of said tunnel, when elevated, connected to said closure means, and cutting means carried by said frame and driven in timed relation to movement of said plastic tube and the articles therein for cutting said plastic tube into individual sections each one of which encloses a group of said articles.

17. Apparatus for use in securing a tube of plastic film to articles enclosed within the tube where abutted articles are received within a continuous tube of the film and where the articles and tube are continuously moved through the apparatus which comprises driven conveyor means with longitudinally spaced means thereon for engaging said articles to separate them into longitudinally spaced groups and to move the plastic tube longitudinally of the supplied stream of articles, the improvement comprising a frame, a heat shrink tunnel through which the tube and articles are moved operatively associated with and above said frame, means mounting said tunnel for vertical movement to and from operative association with a portion of said frame and said tube and the articles therein, air flow control means on said frame portion to guide air received from said tunnel up towards the bottom of said tube and the articles received therein, means on said frame and above said tunnel for closing the ends of said tunnel when it is elevated, closure means for the bottom of said tunnel positioned at the lower end of said tunnel, and means for moving said closure means to operative position to cover the bottom of said tunnel, when elevated, connected to said closure means.

18. Apparatus for use in securing a tube of plastic film to articles enclosed within the tube where groups of abutted articles are received within a continuous tube of the film, which apparatus comprises the improvement of driven conveyor means engaging the articles and film and moving them through a fixed path with the articles retained in longitudinally spaced groups, a heat shrink tunnel through which the tube and articles are moved by said conveyor means, means mounting said heat shrink tunnel for movement to and from operative engagement with said conveyor means and articles moved thereby, a pair of cutter means for said film on said frame adjacent said conveyor means, and drive means operatively connecting to said cutter means and to said conveyor means for driving said cutter means in timed relation to movement of said conveyor means, said cutter means being positioned to cut longitudinally spaced portions of said plastic film tube intermediate said groups of articles.

19. In a method of packaging articles in a transparent heat shrinkable plastic film enclosure where a stream of abutted articles is moved along a fixed path and a continuous strip of a plastic film is positioned loosely around the articles, the steps of separating the articles in the moving stream into longitudinally spaced groups and simultaneously moving the tube of film relative to the articles so that spaced groups of articles are positioned within a continuous tube of film, moving the tube of film and articles therein through a heating tunnel to shrink the film into engagement with its associated articles, and when the movement of the articles and film is stopped, moving the heating tunnel to a position remote from the film and articles therein, and maintaining an elevated temperature in the heating tunnel when in its remote position.

20. A method as in claim 19 where the heating tunnel has air discharge openings therein, including the steps of closing said openings at least when said tunnel is in its remote position.

References Cited
UNITED STATES PATENTS

| | | | |
|---|---|---|---|
| 3,156,812 | 11/1964 | Forman et al. | 53—30 XR |
| 3,239,991 | 3/1966 | Copping | 53—30 |
| 3,269,086 | 8/1966 | Cloots et al. | 53—180 |
| 3,309,835 | 3/1967 | Peppler | 53—30 |

WILLIAM W. DYER, JR., *Primary Examiner.*

G. Y. CUSTER, JR., *Examiner.*